United States Patent
Kennedy et al.

(10) Patent No.: US 12,203,534 B1
(45) Date of Patent: Jan. 21, 2025

(54) ELECTRIC DRIVE MOTOR WITH INTEGRATED WINCH

(71) Applicant: FCA US LLC, Auburn Hills, MI (US)

(72) Inventors: Christopher C Kennedy, Rochester Hills, MI (US); Brian M Swanson, Oakland, MI (US); Richard S Silbert, Bingham Farms, MI (US); Pablo Gutierrez, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/422,615

(22) Filed: Jan. 25, 2024

(51) Int. Cl.
 *F16H 48/11* (2012.01)
 *F16H 3/66* (2006.01)
 *F16H 57/08* (2006.01)

(52) U.S. Cl.
 CPC ............... *F16H 3/66* (2013.01); *F16H 48/11* (2013.01); *F16H 57/082* (2013.01)

(58) Field of Classification Search
 CPC .......... F16H 3/66; F16H 48/11; F16H 57/082; F16H 37/08
 See application file for complete search history.

(56) References Cited

U.S. PATENT DOCUMENTS

| | | | | |
|---|---|---|---|---|
| 3,776,513 A | * | 12/1973 | Mosley | B66C 3/125 254/379 |
| 3,893,572 A | * | 7/1975 | Axelsson | F15B 11/04 212/196 |
| 2010/0116577 A1 | * | 5/2010 | Bixler | A61G 3/0209 296/26.05 |
| 2018/0312275 A1 | * | 11/2018 | Mecklenburg | B66D 1/485 |

\* cited by examiner

*Primary Examiner* — Edwin A Young
(74) *Attorney, Agent, or Firm* — Jeremy J. Klobucar

(57) ABSTRACT

A gearbox assembly for an electric drive module (EDM) having an electric motor that selectively provides drive torque for an electrified vehicle is provided. A differential is driven by the electric motor and is configured to selectively drive first and second drive axles. A planetary gear set is configured to selectively connect to an output of an electric motor through the differential, the planetary gear set including a sun gear, a ring gear and a planetary carrier. A winch includes a spool and is selectively driven by the planetary gear set. The gearbox assembly is switchable between (i) a first drive mode where the drive torque is routed from the electric motor, through the differential and to the first and second drive axles; and (ii) a second winch mode where the drive torque is routed from the electric motor, through the differential and to the spool.

19 Claims, 4 Drawing Sheets

ELECTRIC DRIVE MOTOR WITH INTEGRATED WINCH

FIELD

The present application relates generally to electrified vehicles and, more particularly, to an electrified vehicle having a winch that is driven by an electric motor of the electrified vehicle.

BACKGROUND

An electrified vehicle (hybrid electric, plug-in hybrid electric, range-extended electric, battery electric, etc.) includes at least one battery system and at least one electric motor. Typically, the electrified vehicle could include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. Some electrified vehicles are configured as off-road vehicle and have various powertrain configurations (four-wheel or all-wheel drive) suitable to negotiate off-road terrain. For some extreme off-roading vehicles, a winch can be attached to the vehicle such as on a bumper. Typically, the winch is part of a dedicated accessory assembly that includes an electric motor that spools a cable having a tow hook on a distal end. Therefore, a need exists for improved winch implementations on electrified vehicles.

SUMMARY

In accordance with one example aspect of the invention, a gearbox assembly for an electric drive module (EDM) having an electric motor that selectively provides drive torque for an electrified vehicle is provided. A differential is driven by the electric motor and is configured to selectively drive first and second drive axles. A planetary gear set is configured to selectively connect to an output of an electric motor through the differential, the planetary gear set including a sun gear, a ring gear and a planetary carrier. A winch includes a spool and is selectively driven by the planetary gear set. The gearbox assembly is switchable between (i) a first drive mode where the drive torque is routed from the electric motor, through the differential and to the first and second drive axles; and (ii) a second winch mode where the drive torque is routed from the electric motor, through the differential and to the spool of the winch.

In addition to the foregoing, the winch is selectively driven by the planetary carrier of the planetary gear set.

In addition to the foregoing, the spool comprises a cable that winds and unwinds thereon during operation of the gearbox assembly in the second winch mode.

In addition to the foregoing, the spool is disposed within an engine compartment of the electrified vehicle.

In addition to the foregoing, the spool is disposed behind a front fascia of the electrified vehicle.

In addition to the foregoing, the gearbox assembly further comprises an actuator that selectively routes drive torque into the planetary gear set upon switching to the second winch mode.

In addition to the foregoing, the spool defines a pass-through bore and one of the first and second drive axles passes through the pass-through bore.

In addition to the foregoing, the ring gear is fixed for rotation during the second winch mode.

In accordance with one example aspect of the invention, a method for operating a gearbox assembly for an electric drive module (EDM) having an electric motor that selectively provides drive torque for an electrified vehicle is provided. The method includes receiving a signal indicative of a winch mode being activated; locking wheels of the electrified vehicle based on the winch mode being activated; sending a signal to an actuator, the actuator routing drive torque from the electric motor to a winch having a spool; and driving the winch with the electric motor.

In addition to the foregoing, the gearbox assembly further includes a differential driven by the electric motor and configured to selectively drive first and second vehicle axles; and a planetary gear set configured to selectively connect to an output of an electric motor through the differential, the planetary gear set including a sun gear, a ring gear and a planetary carrier.

In addition to the foregoing, the gearbox assembly is selectively switchable between (i) a drive mode where the drive torque is routed from the electric motor, through the differential and to the first and second drive axles; and (ii) the winch mode where the drive torque is routed from the electric motor, through the differential and to the spool.

In addition to the foregoing, the spool comprises a cable and wherein driving the winch with the electric motor comprises one of winding and unwinding the cable relative to the spool.

In addition to the foregoing, the spool is disposed within an engine compartment of the electrified vehicle.

In addition to the foregoing, the spool is disposed behind a front fascia of the electrified vehicle.

In addition to the foregoing, sending the signal to the actuator further comprises selectively routing drive torque into the planetary gear set upon switching to the winch mode.

In addition to the foregoing, the spool defines a pass-through bore and one of the first and second drive axles passes through the pass-through bore.

In addition to the foregoing, the ring gear is fixed for rotation during the winch mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there exists an opportunity for improvement in the art of winches configured on electrified vehicles. Electrified vehicles is used herein to comprise any vehicle that has at least one electric motor that delivers drive torque to a drive wheel such as gasoline hybrid electric, plug-in hybrid electric, range-extended electric, and battery electric. As described herein, an electric drive module (EDM) is configured to provide a rotatable input to an electric drive gearbox assembly. The electric drive gearbox assembly is configured to selectively and alternatively provide torque to drive wheels of the vehicle (in a first drive mode) or rotate a spool used as a winch (in a second winch mode). The spool can rotate to spool and unspool a cable having a tow hook during a winch event. A planetary gearset is configured in the electric drive gearbox assembly that provides a reduction allowing increased torque to rotate the spool. The configuration of the electric drive gearbox assembly leverages the electric power input already incorporated on an electrified vehicle to act as a driving force on a winch. In this regard, a supplemental electric motor and related winch mounting hardware including enhanced bumpers used to support the electric motor can be avoided.

Figure 1:
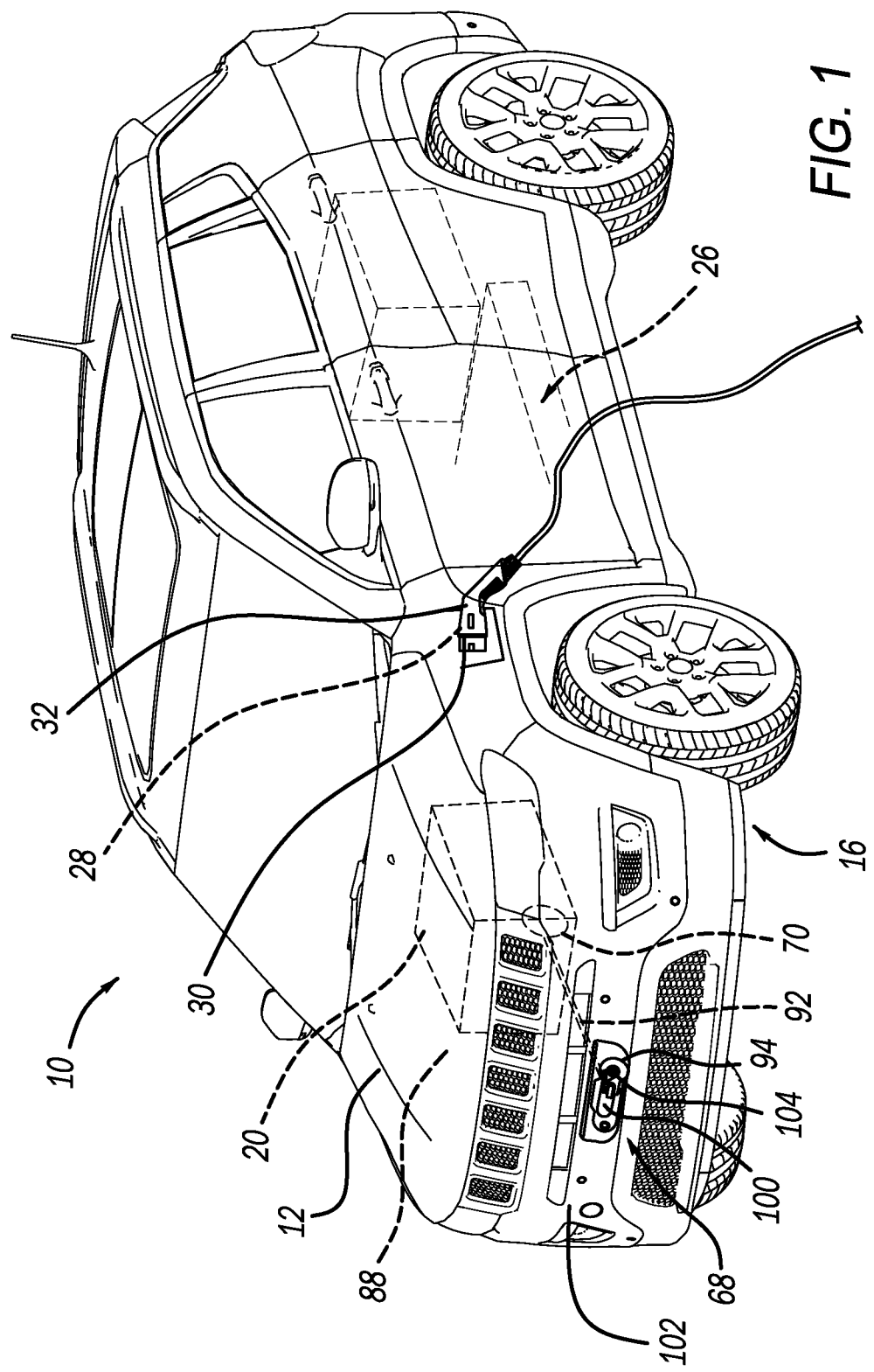
FIG. 1 is a front perspective view of an electrified vehicle incorporating a winch driven by the electric drive motor of the electrified vehicle according to the principles of the present disclosure.
Figure 2:
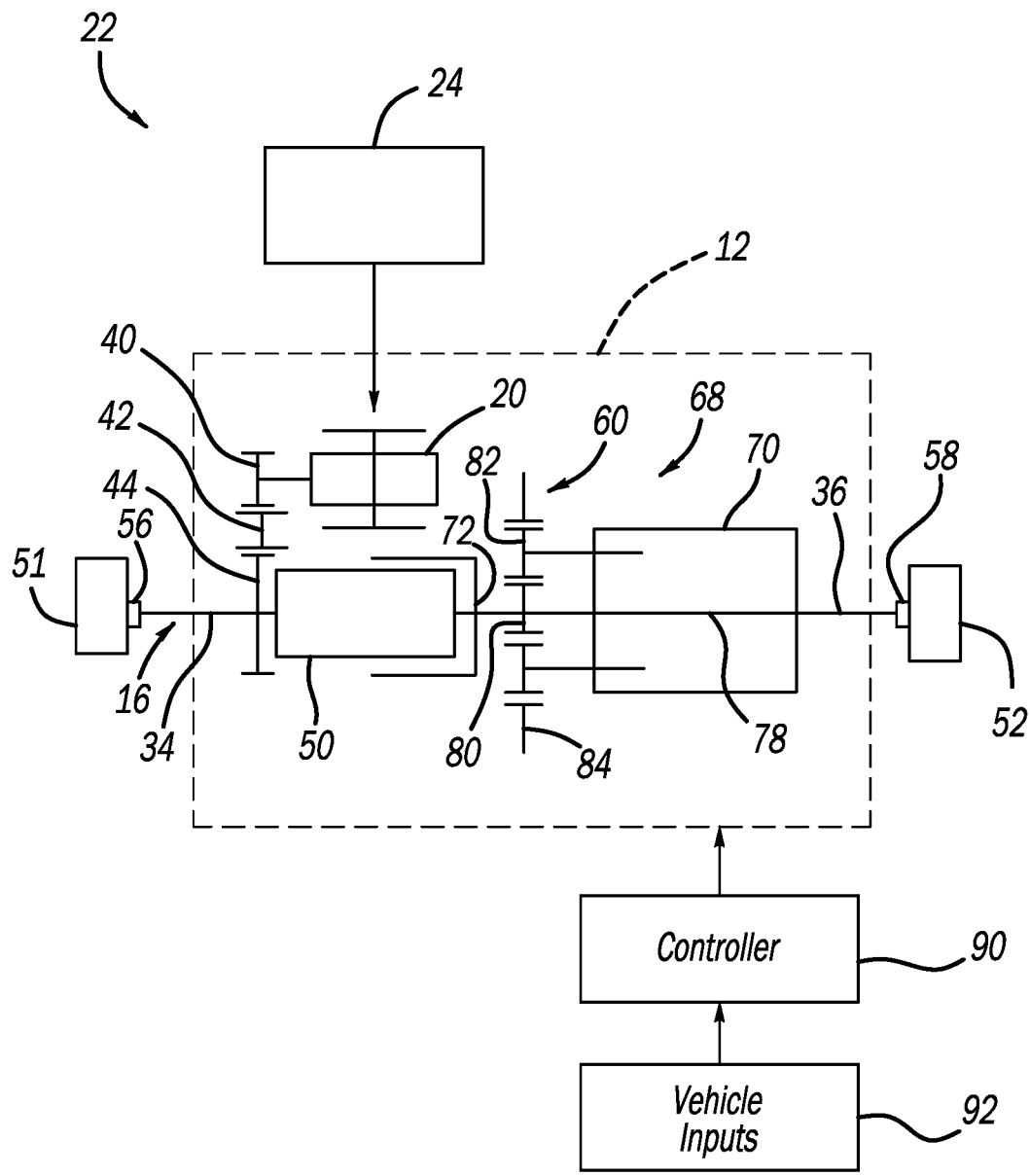
FIG. 2 is a schematic diagram of one example configuration of an electric drive gearbox assembly of the electrified vehicle of FIG. 1 powered by the electric drive motor.
Figure 3:
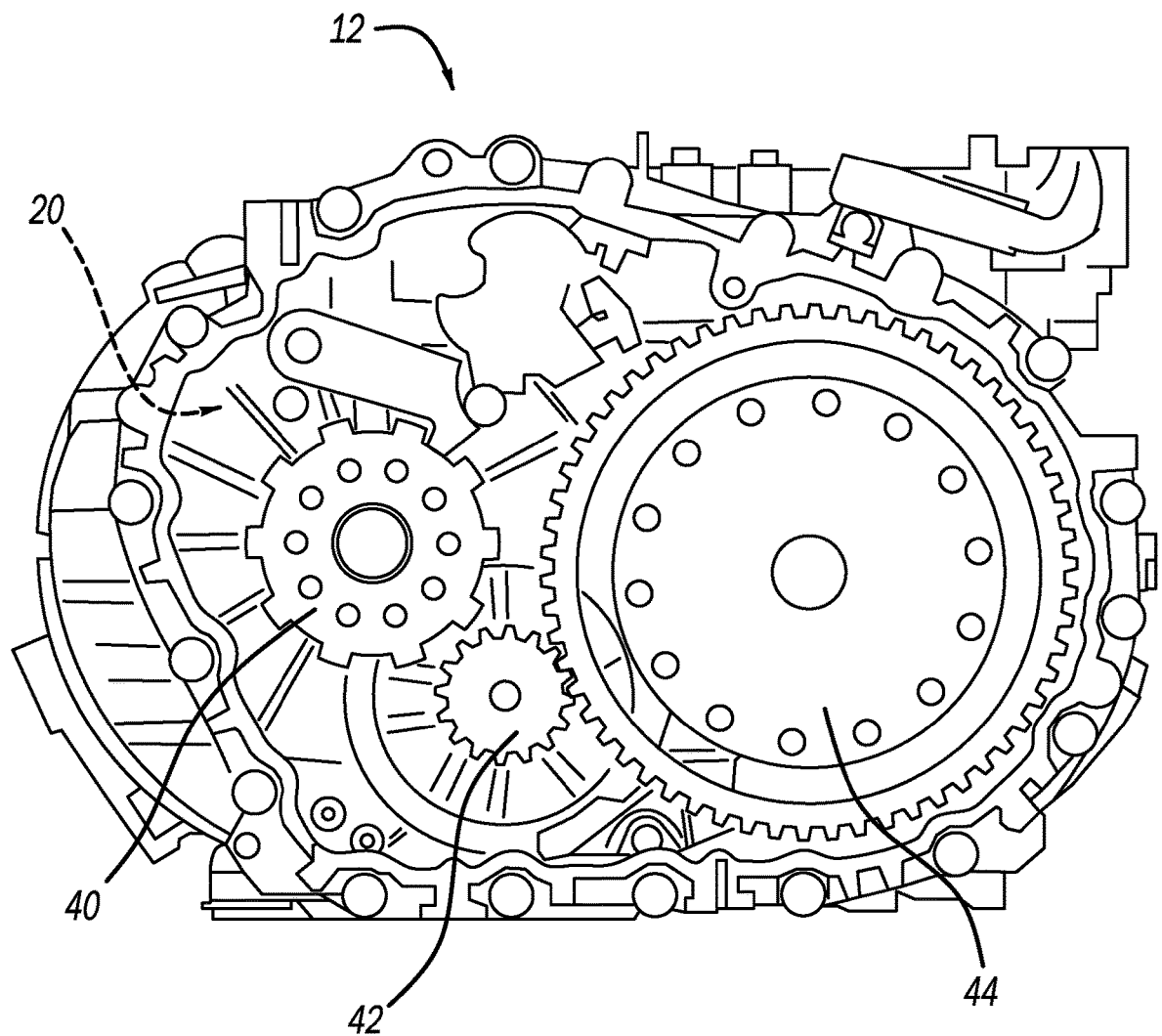
FIG. 3 is a front view of an output gear of the electric drive motor, a transfer gear and an output gear of a differential of the electric drive gearbox assembly of FIG. 2.

With initial reference to FIG. 1, an electrified vehicle 10 is partially shown in accordance with the principles of the present disclosure. The electrified vehicle 10 is a unibody style vehicle. In the example embodiment, the electrified vehicle 10 includes an electric drive module (EDM) 12 configured to generate and transfer drive torque to a driveline 16 for vehicle propulsion. The EDM 12 generally includes one or more electric drive units or motors 20 (e.g., electric traction motors), an electric drive gearbox assembly 22, and power electronics including a power inverter module (PIM) 24. The electric motor 20 is selectively connectable via the PIM 24 to a high voltage battery system 26 for powering the electric motor 20. The electrified vehicle 10 includes a vehicle charging inlet 28 provided at a charging port 30 for receiving a charge plug 32 during a charging event. The present disclosure is advantageous as it can be implemented in a unibody style vehicle (e.g., less than full frame vehicles) because the EDM 12 is mounted to cradle or sub-frame and not hanging over the front axle.

The electric drive gearbox assembly 22 is configured to transfer the generated drive torque to the driveline 16, including a first or left axle shaft 34 and a second or right axle shaft 36. In the example shown, the EDM 12 is configured for use on a front axle of a two-wheel drive vehicle. It is appreciated however that the EDM 12 can be alternatively configured for use on a rear axle of a two-wheel drive vehicle. In other examples an EDM 12 can be provided on both of the front and rear axles for a four-wheel drive or all-wheel drive driveline vehicle.

In the example embodiment, the electric motor 20 generally includes an electric motor output shaft 40. The electric motor output shaft 40 drives a transfer gear 42 that in turn drives an output gear 44 on a differential 50. In the first drive mode, the differential 50 drives the vehicle axles 34, 36 (e.g., half shafts) and therefore respective drive wheels 51, 52. In the illustrated example, the EDM 12 is configured for a front axle (axles 34, 36) of the vehicle 10, but it will be appreciated that the systems and methods described herein are equally applicable to a rear axle EDM configuration, and can be replicated on the front and rear axles for four wheel drive. A first wheel end disconnect 56 can be configured between the front axle 34 and the drive wheel 51. A second wheel end disconnect 58 can be configured between the front axle 36 and the drive wheel 52. The first and second wheel end disconnects 56, 58 can selectively disconnect drive torque from the axles 34, 36 to the drive wheels 51, 52 during the winch mode.

The electric drive gearbox assembly 22 further includes a planetary gearset 60 and a winch 68 having a rotating drum or spool 70. The planetary gearset 60 and winch 68 are used when in the second winch mode for operating the winch 68. The planetary gearset 60 can be selectively driven off of the differential 50 and acts as a reduction for delivering increased torque to the spool 70 during the winch mode. In examples, an actuator 72 can actuate to engage the planetary gearset 60 for rotation with the differential 50. As used herein, the actuator 72 can be any electrical, mechanical, electromechanical or other device that selectively routes torque through the planetary gearset 60 and ultimately to the winch 68 and spool 70. In this regard, the actuator 72 can be a clutch, shift mechanism and/or other device suitable for routing torque to the winch 68 and spool 70 in the winch mode. By way of non-limiting example, the planetary gearset 60 can provide a 32.1:1 reduction. Other configurations are contemplated. In implementations, the spool 70 defines spool defines a pass-through bore 78 that accommodates the shaft 36.

The planetary gearset 60 includes a sun gear 80, a planetary carrier 82 that supports planet gears, and a ring gear 84. In one implementation, the output shaft 36 passes through the sun gear 80. In the example shown, the planetary carrier 82 is configured as the drive output to the winch 68 in the second winch mode. In examples, the ring gear 60 can be locked or fixed from rotation. In some examples, the ring gear 60 can be splined to a housing.

In examples, the winch 68 and spool 70 is disposed in an engine compartment 88 of the electrified vehicle 10. A cable 92 is configured to wind and unwind from the spool 70 during operation of the electric drive gearbox assembly in the second winch mode. A distal end of the cable 92 can include a tow hook 94 that can be configured to extend outward from a passage 100 defined in a bumper 102 of the electric vehicle 10. When the winch 68 is in an undeployed condition (cable 92 spooled onto the spool 70), the tow hook 94 can be coupled at a post 104 or other feature on the bumper 102. Other configurations are contemplated. Of note however, because the winch 68 and spool 70 are disposed in the engine compartment 88, the winch 68 and spool 70 reside generally behind a front fascia of the electrified vehicle 10 in a non-obtrusive manner providing further protection of the winch 68 and spool 70 from the elements.

According to examples, the electrified vehicle 10 includes a controller 90 that receives vehicle inputs 92. In examples, the controller 90 can provide signals to the electric drive gearbox assembly 22 for changing operating modes between the first drive mode and the second winch mode. Vehicle inputs 92 can include a winch mode activation input. The winch mode can be activated such as by a button provided outside the electrified vehicle 10 (such as on or near the front bumper), inside the electrified vehicle 10 (such as on a steering wheel or through an infotainment system), or initiated through a smart device (phone, tablet, etc.) that is wirelessly connected to the electrified vehicle. When winch mode is selected, the controller 130 sends a signal to the actuator 72 that actuates to engage the planetary gearset 60 (and therefore the winch 68 and spool 70) for rotation with the differential 50.

Figure 4:
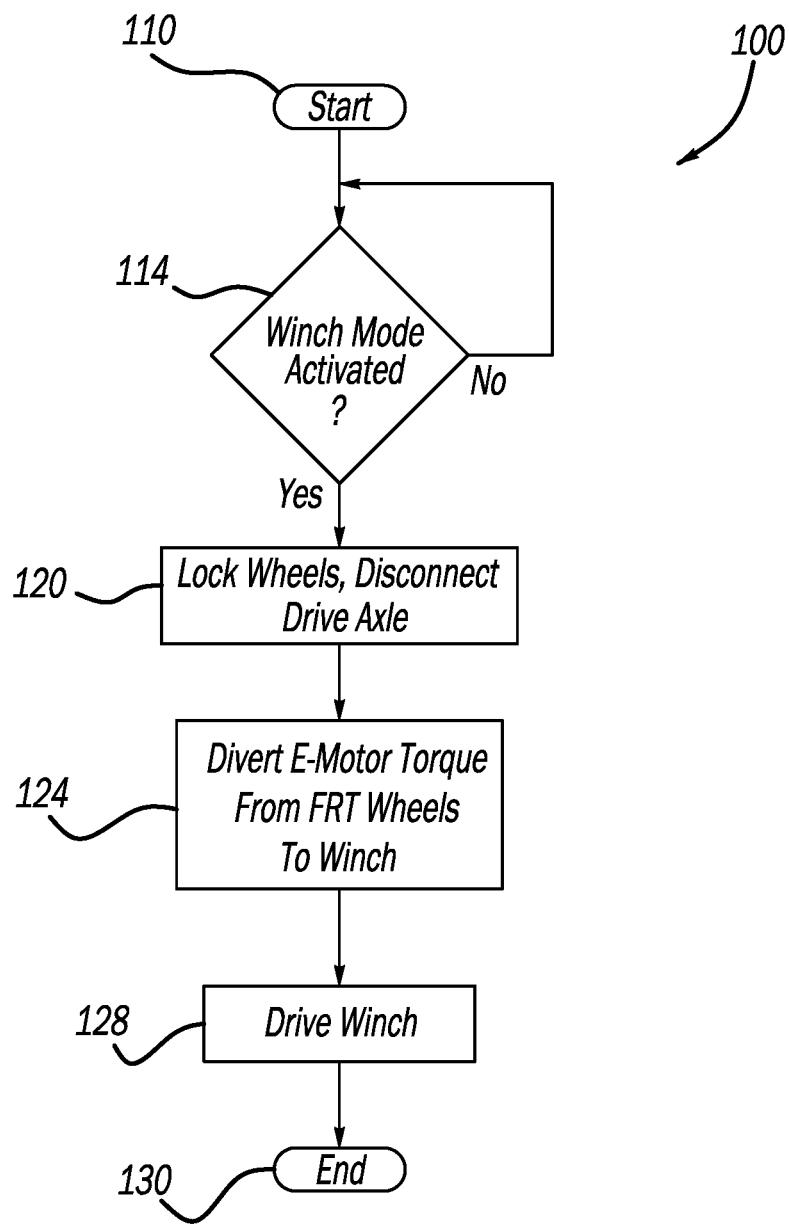
FIG. 4 is a flow chart illustrating exemplary use case scenarios for operating the winch in the electrified vehicle of FIG. 1 according to various examples of the present disclosure.

With additional reference now to FIG. 4, an exemplary method for operating the winch in the electrified vehicle according to various examples of the present disclosure will be described. The method is generally referred to at reference numeral 100. The method 100 starts at 110. At 114 control determines whether the winch mode has been activated. Again, winch mode can be activated in a number of ways such as, but not limited to actuation of a button (at the vehicle inputs 132) provided outside the electrified vehicle 10 (such as on or near the front bumper), inside the electrified vehicle 10 (such as on a steering wheel or through an infotainment system), or initiated through a smart device (phone, tablet, etc.) that is wirelessly connected to the electrified vehicle 10.

If winch mode has not been activated, control loops to 114. If winch mode has been activated at 114, control locks the wheels 51, 52 at 120. When winch mode is activated, the vehicle 10 will secure itself with the rear park brake and the front axles 34, 36 will disconnect from the wheels. This allows for the vehicle 10 to be stable and not drive toward the obstacle or rescue vehicle during a winching event. In examples, the controller 130 can engage a park brake or other feature that locks the wheels 51, 52. In additional features, all wheels including other driven or undriven wheels can be locked. At 124, torque from the motor 20 is diverted from the drive wheels 51, 52 to the winch 68 for rotating the spool 70. As explained above, the planetary gearset 60 is driven off of the differential 50 such as by actuation of the actuator 72 causing drive torque to flow through the planetary carrier 82 and to the winch 68. At 128 the winch 68 is driven 228. The method ends at 130. It is contemplated that winch mode can end based on an input from the user (e.g., actuation of the button, etc.).

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A gearbox assembly for an electric drive module (EDM) having an electric motor that selectively provides drive torque for an electrified vehicle, the gearbox assembly comprising:
   a differential driven by the electric motor and configured to selectively drive first and second vehicle axles;
   a planetary gear set configured to selectively connect to an output of the electric motor through the differential, the planetary gear set including a sun gear, a ring gear and a planetary carrier; and
   a winch having a spool, the winch selectively driven by the planetary gear set;
   wherein the gearbox assembly is switchable between (i) a first drive mode where the drive torque is routed from the electric motor, through the differential and to the first and second vehicle axles; and (ii) a second winch mode where the drive torque is routed from the electric motor, through the differential and to the spool.

2. The gearbox assembly of claim 1, wherein the winch is selectively driven by the planetary carrier of the planetary gear set.

3. The gearbox assembly of claim 2, wherein the spool comprises a cable that winds and unwinds thereon during operation of the gearbox assembly in the second winch mode.

4. The gearbox assembly of claim 3, wherein the spool is disposed within an engine compartment of the electrified vehicle.

5. The gearbox assembly of claim 4, wherein the spool is disposed behind a front fascia of the electrified vehicle.

6. The gearbox assembly of claim 2, wherein the ring gear is fixed for rotation during the second winch mode.

7. The gearbox assembly of claim 1, further comprising an actuator that selectively routes the drive torque into the planetary gear set upon switching to the second winch mode.

8. The gearbox assembly of claim 1, wherein the spool defines a pass-through bore.

9. The gearbox assembly of claim 8, wherein one of the first and second vehicle axles passes through the pass-through bore.

10. A method for operating a gearbox assembly for an electric drive module (EDM) having an electric motor that selectively provides drive torque for an electrified vehicle, the method comprising:
    receiving a signal indicative of a winch mode being activated;
    locking wheels and disconnecting drive axles of the electrified vehicle based on the winch mode being activated;
    sending a signal to an actuator, the actuator routing the drive torque from the electric motor to a winch having a spool; and
    driving the winch with the electric motor.

11. The method of claim 10 wherein, the gearbox assembly further includes:
    a differential driven by the electric motor and configured to selectively drive first and second vehicle axles; and
    a planetary gear set configured to selectively connect to an output of the electric motor through the differential, the planetary gear set including a sun gear, a ring gear and a planetary carrier.

12. The method of claim 11, wherein sending the signal to the actuator further comprises selectively routing the drive torque into the planetary gear set upon switching to the winch mode.

13. The method of claim 11, wherein the ring gear is fixed for rotation during the winch mode.

14. The method of claim 10, wherein the gearbox assembly is selectively switchable between (i) a drive mode where the drive torque is routed from the electric motor, through a differential and to the drive axles; and (ii) the winch mode where the drive torque is routed from the electric motor, through the differential and to the spool.

15. The method of claim 14, wherein the spool comprises a cable and wherein driving the winch with the electric motor comprises:

one of winding and unwinding the cable relative to the spool.

16. The method of claim 10, wherein the spool is disposed within an engine compartment of the electrified vehicle.

17. The method of claim 16, wherein the spool is disposed behind a front fascia of the electrified vehicle.

18. The method of claim 10, wherein the spool defines a pass-through bore.

19. The method of claim 18, wherein one of the drive axles passes through the pass-through bore.

* * * * *